United States Patent [19]
Hurko

[11] 3,866,018
[45] Feb. 11, 1975

[54] MOLDED PLASTIC COOKTOP WITH HEATED GLASS-CERAMIC PLATE INSERT

[75] Inventor: Bohdan Hurko, Louisville, Ky.

[73] Assignee: General Electric Company, Louisville, Ky.

[22] Filed: Apr. 1, 1974

[21] Appl. No.: 457,078

[52] U.S. Cl............... 219/460, 219/459, 219/463, 219/464, 219/467
[51] Int. Cl. ............................................ H05b 3/68
[58] Field of Search .......... 219/458, 459, 460, 461, 219/462, 463, 464, 467, 531

[56] References Cited
UNITED STATES PATENTS

| | | | |
|---|---|---|---|
| 2,152,126 | 3/1939 | Young | 219/460 |
| 3,591,753 | 7/1971 | Gartner | 219/464 |
| 3,627,986 | 12/1971 | Anderson | 219/460 |
| 3,632,983 | 1/1972 | Dills | 219/464 |
| 3,636,309 | 1/1972 | Deaton et al. | 219/463 X |
| 3,674,983 | 7/1972 | Hurko et al. | 219/462 |
| 3,733,462 | 5/1973 | Bouchard et al. | 219/460 X |

*Primary Examiner*—Volodymyr Y. Mayewsky

[57] ABSTRACT

A heated cooktop having a high temperature plastic housing of shallow box-like configuration with a large opening in the top wall in which is mounted a heated glass-ceramic plate. The bottom portion of the housing includes a rigid plate supporting a plurality of electric or gas surface heating means in thermal relationship with the underside of the glass-ceramic plate.

5 Claims, 3 Drawing Figures

PATENTED FEB 11 1975   3,866,018

MOLDED PLASTIC COOKTOP WITH HEATED GLASS-CERAMIC PLATE INSERT

BACKGROUND OF THE INVENTION

1. Field of the Invention

The invention relates to glass-ceramic plate cooktops which utilize infrared radiant heating.

2. Description of the Prior Art

In order to reduce the cleaning difficulty of cooktops, entire cooktops have been available on the market in which the exposed surface is formed of heated glass-ceramic plates. Such plates are a generally milk-white, opaque, glass-ceramic or crystalline glass material sold under such trademarks as "PYROCERAM," "CERVIT," and "HERCUVIT." This glass-ceramic material, because of its smooth top surface of almost ground glass finish or texture not only presents a pleasing appearance, but it is also readily cleanable and it does not permit the drainage of spillovers therebeneath.

One such heated glass-ceramic cooktop design is shown in U.S. Pat. No. 3,632,983 of R. L. Dills, which is assigned to the same assignee as is the present invention.

More attention is being focused on safety features to prevent personal injury to small children who might come into contact with high temperature surfaces near the front of the cooktop. For example, it is felt best to maintain the front edge of the cooktop at a maximum temperature below about 130°F.

The principal object of the present invention is to provide a heated cooktop with a glass-ceramic plate that is mounted in a high temperature plastic cooktop of low thermal conductivity.

A further object of the present invention is to provide a high temperature plastic cooktop with a heated glass-ceramic plate insert that is bonded in the cooktop to eliminate any cracks or discontinuities in which food soil and dust might become lodged.

A further object of the present invention is to provide a heated cooktop of the class described where the glass-ceramic plate is of such a size relative to the energy level of the surface heating means that the maximum temperature reached by the peripheral edge of the glass-ceramic plate and hence the peripheral edge of the large opening in the top wall receiving the glass-ceramic plate does not exceed a temperature of about 200°F.

A still further object of the present invention is to provide a heated cooktop of the class described where the glass-ceramic plate is mounted in a cooktop housing of low thermal conductivity to provide a relatively large temperature drop from the surface heating means and the peripheral edge of the glass-ceramic plate such that the edge of the cooktop would not exceed a temperature of about 130°F.

SUMMARY OF THE INVENTION

The present invention, in accordance with one form thereof, relates to a glass-ceramic plate that is heated by at least one surface heating means. This plate is mounted in a high temperature plastic housing that has a top opening in which the plate is mounted as an insert to be substantially flush with the top surface of the housing so that the cooktop appears as an extension of the glass-ceramic plate. This housing is furnished with a rigid plate that supports the surface heating means in thermal relationship with the underside of the glass-ceramic plate.

BRIEF DESCRIPTION OF THE DRAWINGS

This invention will be better understood when taken in conjunction with the accompanying drawings and its scope will be pointed out in the appended claims.

DESCRIPTION OF THE PREFERRED EMBODIMENT

Figure 1:
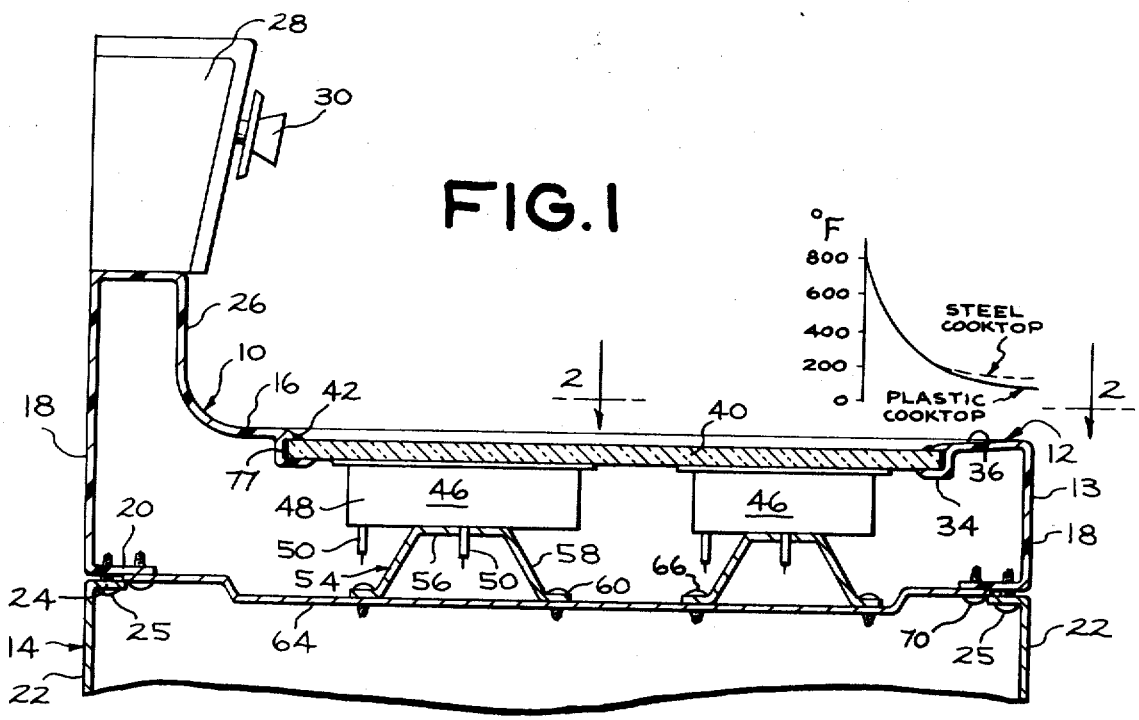
FIG. 1 is a fragmentary, side elevational view in cross-section of a heated cooktop of an electric range, where the cooktop is provided with a large opening in which a glass-ceramic plate is flush mounted as an insert to present a substantially smooth top surface for the cooktop.

Turning now to a consideration of the drawings and in particular to FIG. 1, there is shown only the top portion of an electric range 10 having a horizontal cooktop 12 at generally counterheight. This cooktop 12 is formed as a shallow box-like housing that is mounted on the top of a range cabinet 14 in which would be mounted an insulated oven liner (not shown) and a front access door (also not shown) for forming an oven cooking cavity.

It will be understood by those skilled in the kitchen range art that while the present invention is described with relation to a heated cooktop formed in combination with a baking and broiling oven to form a kitchen range, the present invention is broader in scope to also include houseware appliances known as "hotplates" having either a single surface heating means or a double surface heating means. The present invention would also be useful as a drop-in cooktop design that is mounted flush in a kitchen countertop entirely separate from a baking and broiling oven that would be located remote from the cooktop in that example.

The main element of the heated cooktop 12 of the present invention is a box-like housing 13 that is preferably injection molded of a high temperature polymeric resinous material hereinafter referred to as a plastic material such as polyethersulfone which may be made in almost any color, but preferably would be white to correspond to the milk-white appearance of the glass-ceramic plate. This polyethersulfone material is the preferred material, but there are several other acceptable plastic materials such as polyphenylene sulfide, as well as a polyester that is furnished with fiber glass fillers. The fiber glass fillers serve to improve the impact strength and reduce shrinkage. The last material presents somewhat of a rough surface in view of the presence of the fiber glass fillers. This difficulty is obviated by providing a urethane surface coating over the polyester, at least over the top surface thereof to render a smooth surface comparable to the surfaces of the other embodiments of the plastic material mentioned above.

This plastic housing 13 is furnished with a top surface 16, and each edge of this top surface 16 is provided with a downwardly extending vertical wall 18 of rather short dimension to create a shallow box-like housing. The bottom of the cooktop housing 13 is not furnished with a bottom wall. It is essentially open at the bottom. The vertical side walls 18 are shown furnished with an inwardly turned flange 20 that serves to reinforce the housing as well as serving as a mounting means of the cooktop housing to a supporting structure, as for example the top portion of the oven cabinet 14. This oven cabinet 14 also has vertical side walls 22 that are substantially extensions of the vertical side walls 18 of the cooktop housing. The top edge of these vertical side walls 22 is also provided with an inwardly turned flange 24 on which the flange 20 of the cooktop housing is seated. Suitable removable fastening means 25 would be installed between these two flanges in order to secure the cooktop 12 firmly on the oven cabinet 14.

The back edge of the top surface 16 of the cooktop 12 is shown with an upswept backsplash 26 of medium height on which is mounted a control housing 28 that would contain many of the control components for the heated cooktop 12 as well as for the underlying oven cooking cavity. It will be understood that this control housing 28 could also be molded as an integral part of the cooktop housing 13. These control components are indicated diagrammatically by the illustration of a control knob 30 mounted on a shaft that extends through the front wall of this control housing 28. Such control components would include multiple selector switches, thermostats, oven clock-timer and the like.

Figure 2:
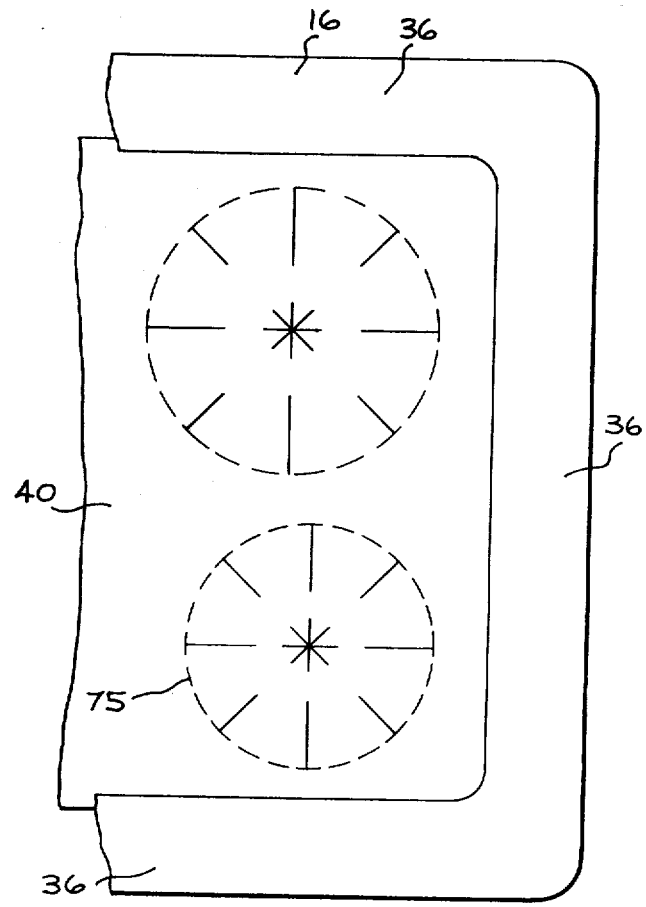
FIG. 2 is a fragmentary, top plan view of the front portion of the heated cooktop of FIG. 1 taken on the lines 2—2, and depicting the clean smooth lines and surface of the cooktop.

The top surface 16 of the cooktop housing 13 is furnished with a large rectangular opening that is circumscribed by a recessed ledge 34. This opening in the top wall 16 of the cooktop housing is of such a large size that it leaves very little of the top wall 16 remaining, except for a narrow border 36, as is best seen in FIG. 2, that extends around the periphery of the top of the cooktop housing 13. Adapted to be mounted or inserted in the large opening of the top wall 16 of the cooktop is a glass-ceramic plate 40 of generally uniform thickness having a smooth top surface that is adapted to support a plurality of cooking utensils. The depth of the recessed ledge 34 is such that it substantially equals the thickness of the glass-ceramic plate 40 such that the top surface of the plate 40 substantially coincides or is flush with the top surface of the cooktop 12, as represented by the narrow border 36. It is important to design a clearance gap 77 between the peripheral side edge of the glass-ceramic plate 40 and the side wall of the recess extending downwardly from the top surface 16 of the cooktop housing 13 so that the plastic material of which the cooktop housing is formed may expand to a greater degree than does the glass-ceramic plate under variations of temperature conditions so that the mismatch in the coefficients of thermal expansion between the glass-ceramic plate material and the plastic material will not cause interference between these parts at fluctuation temperatures as they expand and contract. If the situation were otherwise it might result in buckling of the materials, and perhaps permanent damage during use.

Notice that a small bead 42 is formed as an extension of the plastic top wall 16 to overlie a narrow margin of the peripheral edge of the glass-ceramic plate 40. Because of the small size of this bead 42 it is both flexible and resilient enough so that in installing the glass-ceramic plate 40 this bead 42 may be deflected to allow the glass-ceramic plate 40 to be seated on the recessed ledge 34 before the bead 42 assumes its normal position that would tightly engage the peripheral edge of the glass-ceramic plate. It has been found wise to bond, mold or otherwise fasten the glass-ceramic plate 40 in the recessed opening of the cooktop housing 13, and this may be done by using a silicone material in the clearance gap 77 that surrounds the glass-ceramic plate 40, or the bead 42 may be heated ultrasonically and thereby become bonded to the peripheral edge of the glass-ceramic plate.

Located beneath the glass-ceramic plate 40 is shown a plurality of surface heating means 46 which in the present example are electrical radiant heaters formed by a large block 48 of insulating material that would have a recessed spiral groove in the top surface thereof in which would be seated an open coil electrical resistance heating element (not shown) that would be vertically spaced beneath the bottom surface of the glass-ceramic plate 40 so as not to be in direct contact therewith. The terminals of such an open coil heater are illustrated as elements 50. An example of such electrical radiant heaters 46 is illustrated in the U.S. Pat. No. 3,612,829 to Evans et al., that is assigned to the General Motors Corporation.

While I have chosen to illustrate my invention with relation to electrical radiant heaters 46, it is fully appreciated that the present invention is not limited to electrical heaters and that infrared gas burners may also be employed as for example the ones illustrated in the U.S. Pat. No. 3,470,862 of Darrow et al. which is assigned to Columbia Gas Systems Service Corporation of New York, New York.

Each of these surface heating units 46 is mounted on a raised framework 54 having a top platform 56 and a plurality of inclined, radial struts 58 that are provided with outwardly turned support feet 60. A large rigid metal plate 64 is furnished as the support means for the plurality of surface heating units 46, and suitable fastening screws 66 extend through openings in the feet 60 and into suitable openings in the rigid plate 64. This rigid plate is of such a size that it extends between the inwardly turned flanges 20 along the bottom edge of the vertical side walls 18 of the cooktop housing 12. Suitable fastening means 70 are furnished for attaching the rigid plate 64 to the underside of the cooktop flanges 20. Preferably the cooktop housing 13 would be assembled as a complete subassembly before it is mounted on the oven cabinet 14. This means that both the glass-ceramic plate 40 and the plurality of surface heating means 46 would be assembled in the cooktop housing 13 before this cooktop housing would be lowered onto the oven cabinet 14 and fastened in place by screw fasteners 25.

As best seen in the top plan view of FIG. 2, the glass-ceramic plate 40 is furnished with scribed lines or painted designs 75 which are centered over the surface heating units 46 to indicate to the user the location of the heating means and the place over which the cooking utensil would be positioned to gain the maximum heat transfer characteristics from the heating source.

Below is found a chart of the thermal conductivity $k$ of three materials: (1) steel, (2) glass-ceramic and (3) plastic. This comparison includes steel because steel has been used in the past as the basic material of cooktops for supporting heated glass-ceramic inserts.

| k factor | Btu/hr.ft.² °F. | ratio |
|---|---|---|
| steel | 42.0 | 300 |
| glass-ceramic | 0.60 – 0.80 | 4.6 – 6.1 |
| plastic | 0.13 | 1 |

Considering the plastic material as having a thermal conductivity on the order of 1, the glass-ceramic material will have a thermal conductivity on the order of between 4.6 and 6.1, while the steel has a thermal conductivity about 300 times the thermal conductivity of plastic. Thus, as seen in the temperature curve at the right side of FIG. 1, the maximum temperatures on the top surface of the cooktop 12 will equal about 800°F. over the surface heating units 46, and the temperature at the periphery of the glass-ceramic plate 40 will drop to about 200°F., and finally the temperature at the front edge of the cooktop will drop to about 100°F., which is well below the 130°F. maximum that was recited earlier.

Figure 3:
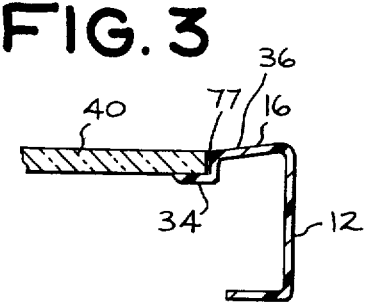
FIG. 3 is a fragmentary view of the preferred embodiment of the manner in which the glass-ceramic plate is supported and bonded in the opening in the top surface of the cooktop of the present invention.

FIG. 3 is a fragmentary cross-sectional elevational view of a preferred embodiment of the present invention showing the details of the cooperation between the peripheral edge of the glass-ceramic plate 40 and the recessed ledge 34 that surrounds the opening in the top surface 16 of the cooktop housing 13. The main difference between this embodiment of FIG. 3, and the first embodiment of FIG. 1 is the elimination of the narrow bead 42 in FIG. 1. This provides an easier assembly method. A filler material that is also adhesive such as a silicone material would be applied in the clearance gap 77 so as to form a soft filler material that will also allow for the expansion and contraction of the glass-ceramic material with respect to the high temperature thermoplastic material of which the cooktop housing 13 is formed.

Modifications of this invention will occur to those skilled in this art. Therefore, it is to be understood that this invention is not limited to the particular embodiments disclosed but that it is intended to cover all modifications which are within the true spirit and scope of this invention as claimed.

What is claimed as new and desired to be secured by Letters Patent of the United States is:

1. A heated cooktop comprising a glass-ceramic plate that is furnished with at least one electric surface heating means, a support means for the glass-ceramic plate in the form of a housing of polymeric resinous material of thin stock, the said housing having a top opening in which the glass-ceramic plate is inserted as a flush mount to form an integral part of the housing, the said housing being of shallow box-like configuration having a top surface, a plurality of shallow vertical side walls extending downwardly therefrom, the surface heating means having support means that include a rigid plate positioned adjacent the bottom of the housing and attached to certain of said side walls, whereby the housing creates a large temperature drop from the edge of the glass-ceramic plate to the outer edge of the cooktop.

2. A heated cooktop as recited in claim 1 wherein the high temperature plastic housing is molded of materials from the class comprising polyethersulfone, polyphenylene sulfide, and polyester with fiber glass fillers and a urethane surface coating.

3. A heated cooktop as recited in claim 1, wherein the said top opening is provided with a recessed ledge surrounding the opening and on which the glass-ceramic plate is seated and bonded so that the top surface of the glass-ceramic plate will be substantially flush with the top surface of the top wall of the plastic cooktop with a minimum clearance gap left between the peripheral side of the glass-ceramic plate and the vertical sides of the recessed ledge so as to accommodate the mismatch of the coefficients of thermal expansion of the glass-ceramic plate and the plastic cooktop and prevent the buckling of the materials under high temperature conditions.

4. A heated cooktop as recited in claim 3 wherein the said high temperature plastic housing is an injection molded part, and the glass-ceramic plate is bonded in place with a high temperature adhesive material such as silicone or the like filling the said minimum clearance gap.

5. A heated cooktop as recited in claim 4 wherein the said high temperature plastic material is preferably a polyethersulfone material.

* * * * *